United States Patent [19]

Mustafa et al.

[11] Patent Number: 4,789,895
[45] Date of Patent: Dec. 6, 1988

[54] SYSTEM FOR SYNCHRONIZING DIGITAL BIT STREAM FOR TELECOMMUNICATION SYSTEM

[75] Inventors: Mehmet Mustafa, Waltham; Ernest P. Tweedy, Lexington; James C. Stoddard, Wayland; Walter J. Beriont, Natick, all of Mass.

[73] Assignee: GTE Government Systems Corporation, Waltham, Mass.

[21] Appl. No.: 44,387

[22] Filed: Apr. 30, 1987

[51] Int. Cl.$^4$ .............................................. H04N 7/04
[52] U.S. Cl. .................................. 358/147; 358/146; 358/148
[58] Field of Search ............... 358/148, 141, 142, 146, 358/147, 143, 145, 86, 83; 375/95, 111, 119

[56] References Cited

U.S. PATENT DOCUMENTS

| | | |
|---|---|---|
| 3,743,767 | 7/1973 | Bitzer et al. .......................... 358/93 |
| 3,746,780 | 7/1973 | Stetten et al. ......................... 358/85 |
| 3,891,792 | 6/1975 | Kimura ................................. 358/142 |
| 4,104,681 | 8/1978 | Saylor et al. ......................... 358/141 |
| 4,129,748 | 12/1978 | Saylor ................................. 358/141 |
| 4,500,751 | 2/1985 | Darland et al. . | 
| 4,578,535 | 3/1986 | Simmons . |
| 4,600,943 | 7/1986 | Tanabe ................................ 358/147 |
| 4,613,827 | 9/1986 | Takamori et al. . |
| 4,616,263 | 10/1986 | Eichelberger . |
| 4,712,131 | 12/1987 | Tanabe ............................... 358/147 |

OTHER PUBLICATIONS

NHK (Japan Broadcasting Corporation) "Present Status of Still-Picture Television"; May 1978.
Berg "Dialoog TV; Kabelexperiment Zuid-Limburg I$^2$-Elektrotechniek/Elektronica"-No. 4-1986, pp. 35-39.
Kimura, A., "Telescan Simultaneous Information Display System" Telecommunication Journal, vol. 42, pp. 33-45, 1975.

Primary Examiner—James J. Groody
Assistant Examiner—David E. Harvey
Attorney, Agent, or Firm—J. Stephen Yeo

[57] ABSTRACT

A telecommunication system for synchronizing a digital bit stream sent from a central facility to a terminal on lines of television frames. Each active line starts with a horizontal sync pulse and a color burst. A first data clock at the central facility provides first data clock pulses synchronized with said color burst. A circuit at the central facility provides a flag bit one clock pulse wide delayed by a first constant number of clock pulses from the start of the line's horizontal sync pulse. A second data clock at the terminal provides second data clock pulses synchronized with said color burst. A circuit at said terminal provides a time window delayed by a second constant number of clock pulses from the start of the line's horizontal sync pulse so as to bracket said flag bit. A plurality of second data clock pulses occur during said time window. Circuits at the terminal determine which of said plurality of second data clock pulses coincide in time with said flag bit, thereby synchronizing said data stream with said second data clock.

2 Claims, 5 Drawing Sheets

SYSTEM FOR SYNCHRONIZING DIGITAL BIT STREAM FOR TELECOMMUNICATION SYSTEM

RELATED APPLICATIONS

The following applications filed simultaneously with this application pertain to different features of the telecommunication systems.

Ser. No. 044,393, filed Apr. 30, 1987 Telecommunication System With Video and Audio Frames is concerned with addressed still frame video and time-compressed audio frames.

Ser. No. 044,388 filed Apr. 30, 1987 Telecommunication System With Burst and Continuous Audio Signals discusses attenuating a continuous background channel when burst audio is played.

Ser. No. 044,394 filed Apr. 30, 1987 Telecommunication System With Selectable Audio Channels describes a system having two or more continuous audio signals sent on a first transmission medium and selected in response to a signal sent on a second transmission medium.

Ser. No. 044,395 filed Apr. 30, 1987 Telecommunication System With Frame Selected Continuous Audio Signals describes a system having framed audio and two or more continuous audio channels which are selected in response to a control signal.

INCORPORATION BY REFERENCE

U.S. Pat. No. 3,746,780 is hereby incorporated by reference.

BACKGROUND OF THE INVENTION

This invention pertains to telecommunications and, more particularly, is concerned with interactive telecommunication systems.

A number of telecommunication systems have been suggested and deployed which allow a terminal user to request particular video information from a remote repository. Services possible with such systems include, but are not limited to, information searches, retrievals, financial transactions, reservations, and shopping.

With some systems, both the user requests and the video information are sent on a single duplex medium such as telephone lines. Examples of such single medium systems are described in U.S. Pat. Nos. 4,500,751 and 4,578,535.

In other systems, requests are sent over telephone lines and the video information is sent over a broader bandwidth medium, such as cable. Examples of such dual media systems are the subjects of U.S. Pat. Nos. 3,746,780 and 4,616,263, and described in I²—Elektrotechniek/Elektronica No. 4-1986, pp. 35–39.

With the system of the aforecited U.S. Pat. No. 3,746,780, a user wanting a service telephones a code number to a central facility. At the central facility, the selected video information is recovered from video discs or other storage means and sent as still television frames to the user over cable or other media. As many terminals are usually coupled to the same medium, each still frame contains a location number or address which is read by address detectors located at the terminals. Only those frames with the same address as the terminal are accepted. An accepted frame may be digitally stored by the terminal and repetitively displayed on a conventional television receiver.

Examples of video information include menus, forms, data, text, and still pictures. It is desirable but lacking in the described system to have audio information such as music and voice accompany the video.

In a publication dated May 1978, NHK (the Japan Broadcasting Corporation) a system is described for sending still pictures with accompanying program sound. Frames for a number of programs are time multiplexed. Each video frame has a code identifying the program to which it belongs. The sound signals of all the programs are digitally encoded and time divisionally multiplexed on lines within an audio frame. Both the video and audio frames are in the standard NTSC format. The video frames are sent serially with each video frame followed by two audio frames. Each video frame carries analog video information corresponding to one program, while each audio frame carries digitized audio information corresponding to all programs.

A receiver seizes and records video frames of a selected program for repetitive display. The analog video may be digitized and stored in a solid state memory while apparently the audio is converted to analog and played as received. The NHK system is appropriate for broadcasting a plurality of predetermined programs, but it is not optimal for interactive broadband services where many users can initiate and interact with programs or services at different times.

SUMMARY OF THE INVENTION

Briefly, according to one aspect of the invention, a system is provided for synchronizing a digital bit stream sent from a central facility to a terminal on lines of television frames. Each active line starts with a horizontal sync pulse and a color burst. A first data clock at the central facility provides first data clock pulses synchronized with said color burst. A circuit at the central facility provides a flag bit one clock pulse wide delayed by a first constant number of clock pulses from the start of the line's horizontal sync pulse. A second data clock at the terminal provides second data clock pulses synchronized with said color burst. A circuit at said terminal provides a time window delayed by a second constant number of clock pulses from the start of the line's horizontal sync pulse so as to bracket said flag bit. A plurality of second data clock pulses occur during said time window. Circuits at the terminal determine which of said plurality of second data clock pulses coincide in time with said flag bit, thereby synchronizing said data stream with said second data clock.

DESCRIPTION OF INVENTION

Figure 1:
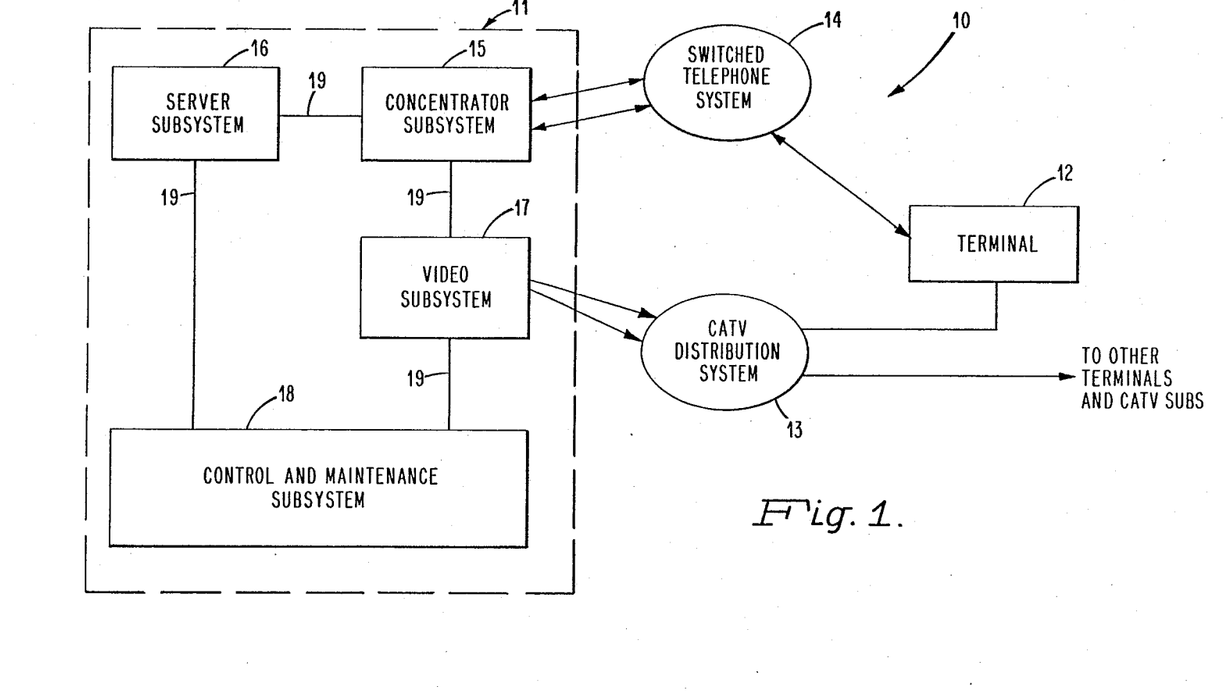
FIG. 1 is a schematic diagram of a telecommunication system embodying the system.

A telecommunication system 10 embodying the invention is shown in FIG. 1. A Central Facility 11 is coupled to a plurality of terminals 12 through a first transmission medium 13 having a bandwidth sufficient to carry standard television frames. First transmission medium 13 may be cable, such as a CATV network. Optical fiber, air, and other wideband media are also suitable. The Central Facility 11 and terminals 12 are also coupled by a second transmission medium 14 allowing duplex transmission of control signals not requiring a large bandwidth. The local switched telephone system is a satisfactory second transmission medium, allowing low bit rate signals to be sent between the facility and a specific terminal. Alternatively, the low bit rate signals can be transmitted over the aforementioned broadband medium 13.

Central Facility 11 provides both video and audio information in response to subscribers' requests. The video information represents still frames of text, pictures, or other images sent as a series of addressed video frames. Each still frame may be displayed for several seconds on a television set or monitor connected to the terminal, during which time it is desirable to provide audio to accompany the video.

The system preferably has two types of audio: continuous and specific, both of which may be played simultaneously. Continuous audio is sent on a real time basis on, for example, audio channels. An example of continuous audio is background music. Specific audio is so called because it is specific to the displayed still frame. Typical specific audio is voiced narrative or instructions. Specific audio is intended for only certain selected terminals at a time and is sent in time-compressed bursts by addressed frames having the same address as the accompanying video frame. Only one channel of time-compressed audio is carried in an audio frame.

Both audio frames and video frames are in the same television format, such as the NTSC system. The same principle is directly applicable to other television systems like PAL or SECAM.

In the NTSC system, each frame is 1/30 second long and consists of two fields with 262.5 horizontal lines each. The lines of two fields are interlaced for a total of 525 lines per frame. Approximately 21 lines occur during a period called the vertical blanking interval (VBI) which is at least 1.33 mS long. These lines do not appear on the television screen, leaving about 483 lines of video in a frame.

The NTSC system is described briefly in "Federal Communication Commission, Public Notices" of Dec. 17, 1953 and June 6, 1954.

When the NTSC standard was written, a minimum VBI of 1.33 mS was necessary to allow the scan to return to the top of the picture tube between fields. Schemes for sending auxiliary information during one or more lines of VBI have been developed such as described in U.S. Pat. No. 3,493,674 and in North American Broadcast Teletext, Specification-Engineering and Development Department, CBS Television, Newark, N.J., June 22, 1981.

In the present invention, addresses, mode codes and error detection/correction are sent on one or more lines (e.g., line 12) during the VBI of both video frames and audio frames. The address alerts an addressed terminal that a correspondingly addressed frame is to be accepted. The mode code identifies the frame as either video or audio, and its sequence with other frames so that the terminal can process it accordingly.

The audio frame information, which may be digital or analog, is sent in time-compressed bursts, allowing one or more seconds of audio to be carried by each 1/30 second frame. The terminal stores the time-compressed audio frame and plays it at normal speed through a television receiver.

The Central Facility 11 consists of four basic subsystems: a Concentrator Subsystem 15, a Server Subsystem 16, a Video Subsystem 17, and Control and Maintenance Subsystem 18.

Each of the subsystems may be implemented on a commercially available general purpose computer, with the interconnections being provided by a Local Area Network (LAN) 19. The software of each of these subsystems may be designed as a self-contained entity, with the inter-subsystem interfaces conforming to a standard inter-processor protocol. This allows for a complete Central Facility system configuration where each subsystem consists of a separate processor or group of processors. However, in smaller configurations, one or more of these subsystems may be implemented on a single computer while still maintaining the software interfaces that allows simple expansion to multi-computer configurations.

The Control and Maintenance Subsystem 18 provides the administration for the Central Facility 11 and is also responsible for the gathering of statistics on the workings of the overall system. The Control and Maintenance Subsystem 18 is not necessary to practice the present invention and will not be discussed further.

The Concentrator Subsystem 15 is the interface to the terminals for all control and communication purposes. It is accessed by a remote terminal on the second transmission medium 14 which may be a dial-up connection through the public telephone network, or an RS232C direct terminal access interface for high usage control terminal activities.

The Server Subsystem 16 acts as the overall controller of a session using input from the Terminal 12, via the Concentrator Subsystem 15, to access the appropriate databases and to send instructions back to the Concentrator Subsystem 15 as to which video and audio frames to send to the user.

Figure 2:
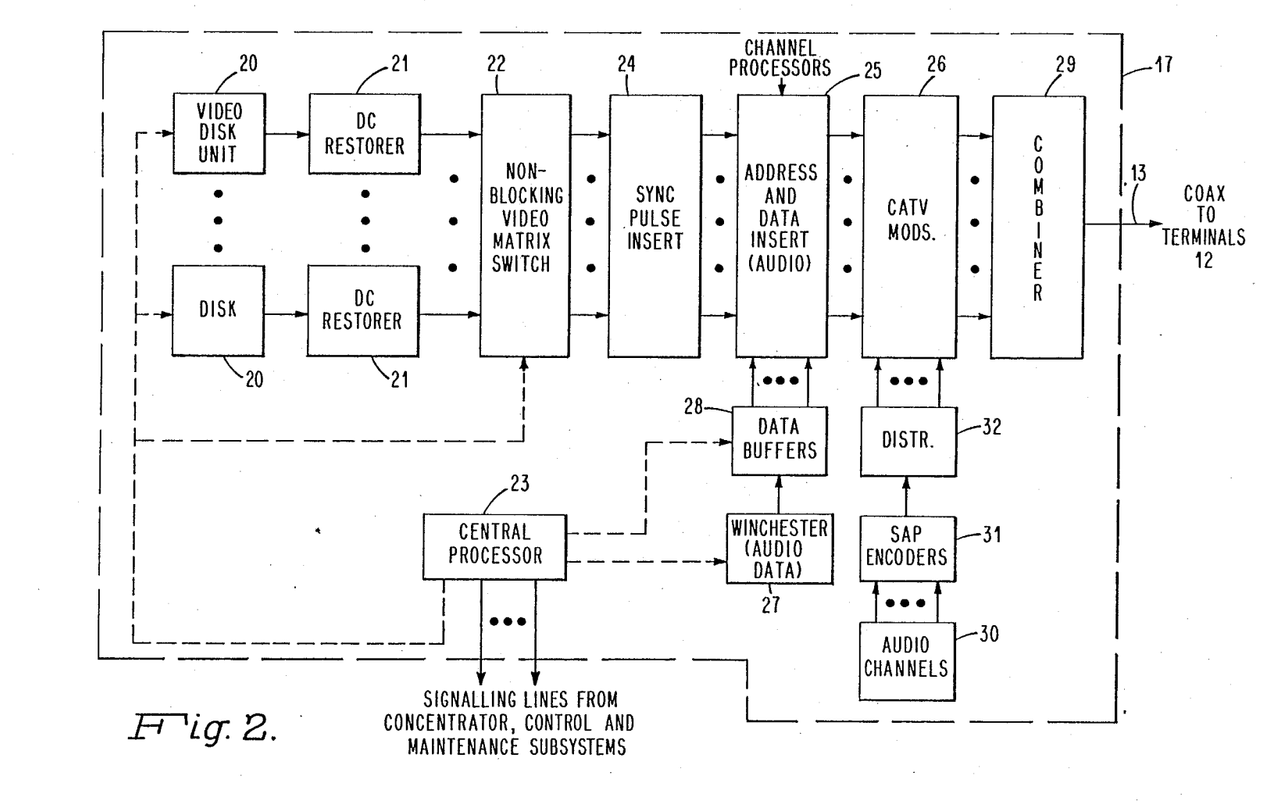
FIG. 2 shows in more detail a video server subsystem of the Central Facility seen in FIG. 1.

The Video Subsystem 17 which is seen separately in FIG. 2 stores and sends to the terminals 12 via the CATV link 13 video and encoded audio information frames. Video still frames are stored in optical Video Disk Units 20 (VDU) in standard NTSC composite baseband format. About 54000 still frames can be stored on each disc.

Since the seek time of the video disc units is longer than desired, many more than the minimum number of video disc units to accommodate all the still frames is needed. The video disc units 20 provide ac coupled signals, so a dc restorer 21 is needed to precede a nonblocking video matrix switch 22.

If the user calls for a video still frame, a central processor 23 identifies its location on an available video disc unit. After the unit has reached the requested still frame, it advises switch 22 which then switches one frame into a pulse insertion device 24. The pulses inserted come directly from the station sync master. The frame is then connected into a channel processor 25 which inserts addressing, mode code and error codes on a VBI line. The addressed frame is connected into the video input of a CATV modulator 26.

Audio frames (of which more than one may be associated with a particular video frame) are previously digitally stored on Winchestertype magnetic discs 26 in a 8-bit PCM encoded format at a sampling rate of 16 KHz for example. A disc drive unit which can accommodate about 1 Gbyte will accommodate about 1000 minutes of audio at 124 kb/s.

It is also possible to store time-compressed audio in analog format to be transmitted as an analog signal.

In order to store as much audio as possible on each frame, the audio is compressed. One or more seconds of real time audio are sent on each 1/30 second frame, depending upon the type of compression.

Central processor 23 identifies those audio frames to accompany a selected video frame and unloads them from the correct addresses in a Winchester disc 26 into a buffer memory 28. After the transfer has been completed, the Central processor 23 calls for a corresponding number of black frames via the switch to accommodate the audio data. These black frames include color bursts for clock recovery in the terminal. Each active line is at black level. In the NTSC system, black is represented by a low signal level. The data is inserted by the channel processor 25. The data bits are converted to pulses which are first conditioned by a Nyquist filter to reduce inter-symbol interference, as well as to prevent interference on the sound channel and the spreading of energy on adjacent channels before they are summed onto the black frame raster.

A transmission bit rate of 8/5 of the color subcarrier frequency 3.579545 MHz (5.727272 Mb/sec) may be used. The data clock has a period of 174.6 nanoseconds. While this is the same bit rate as Teletext, which is approximately the fastest bit rate which can be carried by most CATV systems, the preferred formatting of the data and the method of clocking the incoming data are much more efficient and significantly different.

Figure 4:
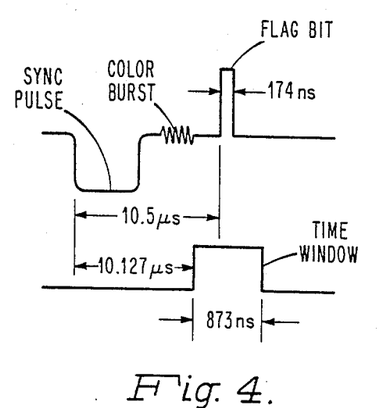
FIG. 4 illustrates waveforms on a bit synchronization system.

Turning briefly to FIG. 4, on each line on which there is data, a flag bit in the form of a "1" bit is placed, for example, 10.5 microseconds (60 data clock pulses) after the leading edge of the horizontal synchronization pulse. It is then followed by 288 bits (i.e., 36 bytes) of data. For the audio data, this results in total of 142272 bits/frame.

Figure 3:
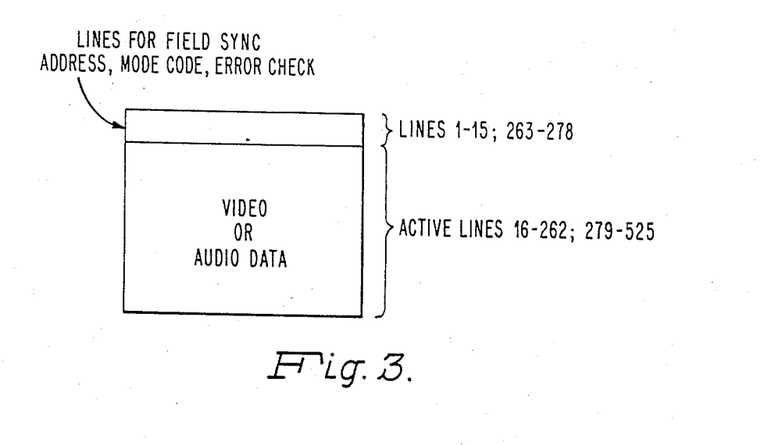
FIG. 3 represents video and audio frames used to carry information from the Central Facility to Terminal.

Referring to FIG. 3, in both audio and video frames four lines within the vertical blanking interval are served for addressing and mode (video or audio) and error codes, and future use. In audio frames, line 16 to 262 on field one and line 279 to line 525 on field two are used for the audio data.

Referring again to FIG. 2, the black frame with the audio data is switched for the period of one frame (approx. 1/30 second) into the video input of a CATV modulator 26. The video frames are also passed on to the video input of the CATV channel modulator 26. There is always a continuous stream of still frames with black burst frames being switched in when no information frames are delivered. Each channel modulator is selected for transmission through a single coaxial distribution system and a single coaxial cable system 13. With a set of projected traffic patterns, there might typically be over 100 active users sharing one channel. Video and audio frames of a program are time multiplexed with others on a CATV video channel and sent to remote terminals. Continuous audio is sent on an audio channel.

Central Facility 11 employs the BTSC multichannel television sound format to place continuous audio (e.g., background music) in up to three separate audio channels 30 in the NTSC composite signal. A SAP (second audio program) channel is used. Three possible channels are the monaural (left plus right), the stereo difference channel, and the SAP channels. It is also possible to make available many more distinctly different background music channels to the user.

Both the continuous audio and the framed specific audio described above may occur simultaneously. When the video specific audio is played out in real time at the user terminal, the background component, if present, is attenuated automatically. The central processor 23 controls the selection of the background channel (or silence) at the user's terminal either through control signals inserted by the channel processor 25 into line 12 of the vertical blanking interval or by control signals sent over the telephone loop 14 by Concentration Subsystem 11. The user may also have the capability of muting it. The continuous audio sources are connected into the audio input of the same modulator 26.

The audio inputs of the channel modulators 26 can be driven either from individual SAP channel encoders 31 or can all be driven from a single encoder using a suitable distribution unit 32.

The video and audio frames, as well as the continuous audio, are distributed through the CATV network 13 to the terminals.

Figure 5:
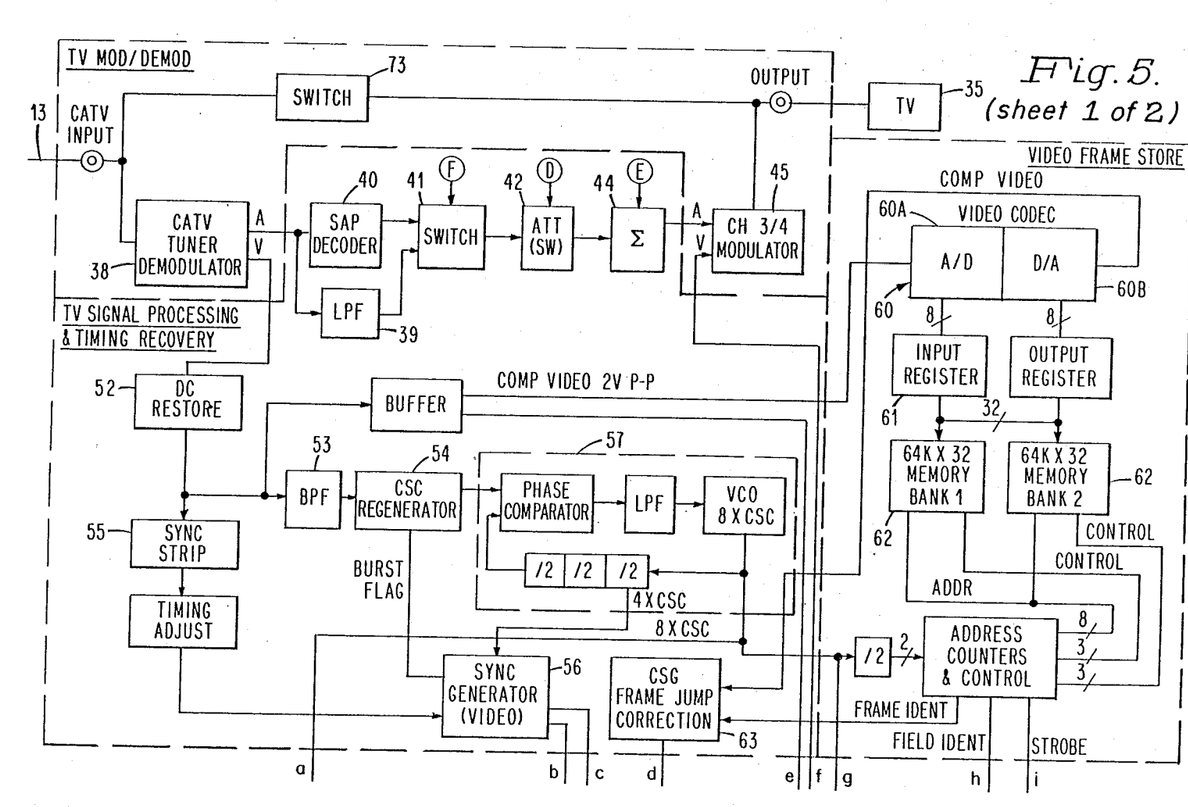
FIG. 5 sheets 1 and 2 are block diagrams of a Terminal used in the system of FIG. 1.

Turning now to FIG. 5, a terminal 12 consists of a set-top module 33 and a remote keypad 34.

A connector panel (not shown) on the set-top module provides various physical connectors, including:
Cable in 13 75 ohm coaxial F-connector
TV out—75 ohm coaxial F-connector
Telephone line—RJ-11 telephone jack
Auxiliary phone—RJ-11 telephone jack.

Through these connectors, the terminal 12 is coupled to a CATV channel 13, telephone loop 14 and a television receiver or monitor 35.

Set-top module 33 contains hardware and software for data communications to and from the Central Facility 11 and for receiving and processing video frames and audio frames sent from the Central Facility and delivering them to the television receiver 35. The set-top module also contains a power supply, and a controllable modem 36 as the interface to the telephone loop 14.

CATV demodulator 38 receives a selected NTSC channel signal over the CATV network. This composite signal contains video frames, digitally encoded audio frames, and BTSC encoded audio channels. CATV demodulator 38 demodulates the incoming signal to baseband and splits the audio channels from the video and audio frames.

The audio channels extracted from the audio output of demodulator 38 are separated by a low-pass filter 39 and a SAP channel decoder 40. They are connected into an analog switch 41, which is controlled by a control signal from the Central Facility 11 sent on the vertical blanking interval, or alternatively through the telephone loop 14 to select baseband audio or SAP audio. Preferably, however, a selection code stripped from a frame controls switch 41 to select the desired continuous audio signal. A locally generated "mute" command overrides the control signal. The selected channel is passed through a switched attenuator 42 (e.g., 12 dB) which is switched in automatically by a signal generated by audio control 43 when audio is being played from the alternate audio-frame source (i.e., audio specifically to accompany the display). This is so the background audio, e.g., music, does not obscure the video specific audio channel, e.g., voice. The output of the attenuator is then connected to a summer 44 which adds the analog signal derived from the audio frame, which is then connected into the audio input of a channel of modulator 45 which couples it to television set 35 for playing.

Each video and encoded audio frame received from the Central Facility 11 had been tagged with a three-byte terminal address and a two-bit mode code and a background sound control code in line 12 of the Vertical Blanking Interval (VBI). A VBI correlation circuits 46, 47, 48 uses the address to decide whether the current frame belongs to the terminal, and the command code to determine the handling of the frame. The mode code can have one or four meanings:

Video frame;
Video frame; stop preceding audio
Audio playout; initial frame
Audio playout; continuation frame.

The vertical and horizontal drives are used to identify all frame lines by number. Line 12 is read out and the address and mode (video or audio) bits are connected over to the VBI processor 46, a mode/tag register 48 and error detector 47. The address is correlated with the user address which is resident in an EPROM 49, and then the mode bits are checked to determine the type of frame, so that appropriate action can be taken. Each frame transmitted from the Central Facility is tagged with numbers that repeat in 64 blocks. These can be interrogated by the Central Facility to check the delivery of any specific still frame recently transmitted.

If the address in line 12 correlates with the terminal ID, then depending upon the mode (video or audio), the frame is inserted into the appropriate store. In the case of audio, they are stored in bursts (line-by-line) of 5.7272 Mb/s and clocked into audio RAM 50, line-by-line through the appropriate set of frames.

After the audio data segment has been received, it is played out from the RAM 50 at the appropriate speed (e.g., 128 kb/s) through D/A converter 51 which includes a 7.5 KHz low pass filter. The analog output from the D/A converter is passed to the sound summer 44 which connects into the audio input of the channel 3 modulator 45. It is summed with the selected continuous audio channel which is attenuated until the sequence is completed.

The frames from demodulator 38 are connected, via a dc restorer 52, to a color subcarrier (3.58 MHz) bandpass filter 53. Its output is passed on to a color-subcarrier regenerator chip 54. For this to operate, it is necessary for it to be provided with a burst flag gate. To achieve this, the synchronization pulses are stripped off the incoming video frames by sync stripper 55 and connected into a synchronization pulse generator 56. The outputs from generator 56 include horizontal drive, vertical drive, and color subcarrier burst flag. All clocking frequencies for synchronization are derived from the color subcarrier bursts always present on the incoming still frames. For sync generator 56 to operate, it needs an input of four times the color subcarrier frequency (14.32 MHz). This is provided by a phase-locked loop 57. The output of the regenerated color subcarrier frequency is connected into the phase-locked loop which locks in a 8 time color subcarrier oscillator from which the 4 times color subcarrier is derived.

The dc restored frames from DC restorer 52 are connected to a buffer which generates TTL logic levels from the bits on the raster. These are connected into the clock generator and data extraction circuit 59. This data extraction makes efficient use of the raster frames.

The leading edges of the horizontal synchronization pulses slope too much to accurately synchronize the bit train. Accordingly, a bit synchronization circuit is used. It will be recalled that the first bit on each data line is a "1," placed 10.5 microseconds (60 data clock pulses after the leading edge of the horizontal sync pulse. This is called a flag bit. The 8 times color subcarrier source is connected to clock generator and data extraction 59 which divides by 5 to derive 174.6 nanosecond data clock pulses. The leading edges of the horizontal synchronization pulses are used to start a count using the data clock 59. Turning now to FIG. 4, after a count of 58 data clock pulses (10.127 microseconds) a gate or time window is opened for the 8 times color subcarrier clock (28.64 MHz) for a period of 5 data clock pulses (873 ns). These 5 data clock pulses are "and"ed with the data bit stream so that when the leading "1" (e.g., flag bit) is present, its position with respect to the five data clock pulses is identified and is used to correctly synchronize the data clock to the rest of the data on the line.

Returning now to FIG. 5, a flash A/D converter 60A, part of video coder 60, clocked at about 14.32 million 8-bit samples per second, continually provides data into input register 61, but it is not transferred into memory bank 62 (3.82 Mb) until a strobe is received. If the mode register 48 recognizes the incoming frame as being addressed to the user terminal and being for video display, a strobe is sent to the video frame store. The memory bank 62 is then loaded from register 61 for the period of exactly one frame (approx. 1/30 second.) It is then played out as still frame through D/A converter 60B repetitively using the 4 times color subcarrier clock (14.32 MHz). Since there is a color subcarrier phase jump between every other frame, this is corrected in the frame jump correction block 63.

Before being connected into the video input of the modulator 45, the video signal is passed through a character generator 64. This is used to insert characters as they are entered from the user keypad 34. They are typically inserted close to the bottom of the screen display.

The system provides interactive data retrieval and transaction. The infra-red keypad 34 provided with the system is equipped with an adequate number of keys (e.g., 53) to interact with the system, including alpha-numeric and various special function keys to provide simplified, dedicated operation of on/off, page forward, page back, pause, purchase and other functions.

The keypad 46 transmits PCM-encoded IR commands to the set-top module via an infra-red receiver 65. The keypad is the mechanism for the user to control the set-top module and to communicate with the Central Facility 11 via the telephone loop 14. The keys are used to control the terminal, Central Facility functions, as well as to input transaction specific data by the users.

IR receiver 65 includes a decoder to convert the special encoded IR pulses into a convenient form for inserting onto the 8085 CPU bus 66.

Data communications with the Central Facility 11 may be provided by modem 36 that transfers asynchronous ASCII data at a rate of 300 or 1200 bps via a telephone switching office. Modem 36 has autodial capability for automatic placement of calls to the Central Facility. LED indicator 74 is a data carrier detector.

The terminal is controlled by microprocessor 67 coupled to system bus 66. A 8085 CPU may be used. MUART 36 is connected to system bus 66.

Decoder interface 68 is used as a buffer between the bus 66 and the circuits associated with the line 12 data. Address decoder 69 is adapted to the 8085 bus 66. The program firmware is stored in EPROM 70. EEPROM 71 is used to store information from Central Facility 11 via the telephone connection 14. Examples of these are the terminal address, passwords, and display characters used before a connection is established.

EEPROM 71 also provides storage of banners and messages for display, and also terminal identification (serial number) and terminal type (version number) for use in the Log-on process. Messages that are stored in EEPROM include the following:

Call being placed
Call completed
Call attempt failure
Video channel failure
IVS session ended
Call disconnected.

Data for these prestored messages can also be downloaded to the terminal over the telephone loop 14 from the Central Facility 11.

Terminal 12 has the capability to receive ASCII text over the telephone line 14 or retrieve it from the EEPROM and switch it onto the video frame currently being displayed. A blank frame generated by sync generator 56 allows display of only the ASCII text. The video character generator 64 produces characters for display on the screen.

When the terminal is in the "off" state, only the infrared receiver is powered. In this state, the set-top module is totally transparent to the TV signal. This transparency is provided by a switch 73 that connects incoming signals to the television set 35 with all set-top module components disconnected.

When the Terminal 12 is turned on, the locally stored banner is displayed on the screen and the terminal modem auto-dials the Central Facility 11. When the Concentrator Subsystem 15 detects the power-up message (which is sent by the Terminal 12 once carrier is detected on the telephone loop 14), it sends a prompt to the Terminal 12 to transmit its identification number. The Concentrator Subsystem 15 then sends a message to the Server to establish a new session.

In one mode of operation, in order to control service use by subscription only, the Server Subsystem 16 sends a log-on form to the terminal 12, and the user ID and Password keyed in by the subscriber are verified against the database. Should the user ID or Password be invalid, the appropriate error message is sent by the Server Subsystem 16. The user is allowed two input errors but if there is still an error on the third attempt, the session is terminated by the Server Subsystem 16 on the assumption that the access is being attempted by an unauthorized user. The carrier signal on the telephone loop 14 is dropped and the Terminal 12 becomes disconnected from the system. When valid ID and Password have been received by the Server Subsystem 16, a confirmation message is sent to the Concentrator Subsystem 15, which in turn sends a "session start-up" message to the Video Subsystem 17.

As part of the subscriber profile in the Server Subsystem database, there is the CATV channel number to which the terminal is tuned and this information is passed to the Video Subsystem 17 as part of the "session start-up" message. The Video Subsystem 17 selects the initial video frame (with associated audio frames as required) from storage as instructed by the Server System 16. The Video Subsystem 17 selects an available time slot on the appropriate channel and sends the selected frame(s) each with the terminal address encoded in line 12 of the VBI. A "start-up response" message is sent from the Video Subsystem to the Concentrator to complete the log-on procedure.

After viewing the initial screen (e.g., a main menu), the Terminal user indicates his next request via one or more keystrokes on the remote keypad. These keystrokes are transmitted over the telephone loop 14 and interpreted by the Concentrator Subsystem 15. The Concentrator System 15 then generates and sends to the Server Subsystem 16 a Video/Audio Processing (VAP) message. The Server Subsystem 16 uses this information to search its database to find the identities of the information frames that will satisfy the subscriber's request. This information is returned to the Concentrator Subsystem 15 in a two-part message. The first part, called the Page Control Record, contains information pertaining to any prompt or cursor controls that must be sent to Terminal 12 via telephone loop 14. This information is retained by the Concentrator Subsystem 15. The second part, called the Page Display Record, contains information concerning the frames to be sent (single frame or timed sequence, identities of all video and audio frams), and this is passed on to the Video Subsystem 17. The Video Subsystem 17 uses the PDR to access the Video Subsystem database and retrieve the requested frames from storage. The frames are then transmitted in sequence to the terminal during a selected available time slot via the CATV link 13.

Processing of the subscriber's requests continues in the manner described above until a log-off message is received by the Concentrator Subsystem 15 which in response sends a disconnect message to both the Server Subsystem 16 and the Video Subsystem 17. The Video Subsystem 17 sends appropriate information regarding the session to the Control and Maintenance Subsystem 18, and deallocates all data structures used in the session.

The use of both a CATV (or equivalent distribution system) and a telephone loop 14 to interconnect the Central Facility 11 and the Terminal 12 allows the addition of more sophisticated interfaces with the system. One such application is the inclusion of a Customer Service Representative (CSR). The subscriber who decides he needs some assistance while in the middle of a session can use either standard telephone calling features or the services of the Concentrator Subsystem 15 to put the connection "on hold" and make a telephone connection to a CSR. The CSR (through a second terminal) would then have the ability to control the user's session, i.e., control what is sent to the terminal 12, while talking to the user over the telephone loop 14. At the end of the consultation, the CSR would drop from the connection, returning control to the user.

What is believed to be the preferred embodiment and best mode of practicing the invention has been described. Other embodiments and modifications will, however, be apparent to those skilled in the art. Therefore, the scope of the invention is to be determined by the claims.

What is claimed is:

1. A system for identifying the position, within a time window, of a flag bit included in a digital bit stream sent from a central facility to a terminal on lines of television frames, wherein each line starts with a horizontal sync pulse and a color burst, comprising:

a first data clock at the central facility for providing first data clock pulses synchronized with said color burst;

means at said central facility for providing on one of said lines a digital data stream headed by said flag bit which is one of said clock pulses wide and is delayed by a first constant number of said clock pulses from the start of the horizontal sync pulse;

a second data clock at said terminal for providing second data clock pulses synchronized with said color burst;

means at said terminal for providing said time window delayed by a second constant number of said second clock pulses from the start of the horizontal sync pulse and bracketing said flag bit but not said horizontal sync pulse or said color burst;

means at said terminal for providing a plurality of second data clock pulses during said time window; and means at said terminal for determining which of said plurality of second data clock pulses coincide in time with said flag bit to identify the position of the flag bit with respect to said plurality of second data clock pulses.

2. A system for identifying the position, within a time window, of a flag bit included in a digital bit stream sent from a central facility to a terminal on active lines of television frames, wherein each active line starts with a horizontal sync pulse and a color burst, comprising:

a first data clock at the central facility for providing first data clock pulses synchronized with said color burst;

means at said central facility for providing on one of said lines digital data stream representing digital audio headed by said flag bit which is one of said clock pulses wide and is delayed by a first constant number of said clock pulses from the start of the line's horizontal sync pulse;

a second data clock at said terminal for providing second data clock pulses synchronized with said color burst;

means at said terminal for providing said time window delayed by a second constant number of said second clock pulses from the start of the lines horizontal sync pulse and bracketing said flag bit but not said horizontal sync pulse or said color burst;

means at said terminal for providing a plurality of second data clock pulses during said time window; and means at said terminal for determining which of said plurality of second data clock pulses coincide in time with said flag bit to identify the position of the flag bit with respect to the plurality of second clock pulses.

* * * * *